United States Patent [19]

Sohre

[11] E Re. 30,720

[45] Reissued Aug. 25, 1981

[54] CONTOURED SUPERSONIC NOZZLE

[76] Inventor: John S. Sohre, 1 Lake View Cir., Beaver Lake, Ware, Mass. 01082

[21] Appl. No.: 923,921

[22] Filed: Jul. 12, 1978

Related U.S. Patent Documents

Reissue of:

[64] Patent No.: 3,968,935
Issued: Jul. 13, 1976
Appl. No.: 491,392
Filed: Jul. 24, 1974

U.S. Applications:

[63] Continuation-in-part of Ser. No. 362,402, May 21, 1973, abandoned.

[51] Int. Cl.[2] ..... B05B 15/00; B05B 17/00

[52] U.S. Cl. ..... 239/289; 415/216; 415/181

[58] Field of Search ..... 239/289; 415/216, 217, 415/218, 199 R, DIG. 1, 181

[56] References Cited

U.S. PATENT DOCUMENTS

| | | | |
|---|---|---|---|
| 767,689 | 8/1904 | Hedlund | 415/199 R |
| 2,735,612 | 2/1956 | Hausmann | 415/DIG. 1 |
| 2,910,005 | 10/1959 | Angell et al. | 415/181 |
| 3,804,335 | 4/1974 | Sohre | 239/289 |

FOREIGN PATENT DOCUMENTS

| | | | |
|---|---|---|---|
| 815972 | 10/1951 | Fed. Rep. of Germany | 415/199 R |
| 9367 | of 1908 | United Kingdom | 415/199 R |
| 446486 | 5/1937 | United Kingdom | 415/217 |

*Primary Examiner*—James B. Marbert

[57] ABSTRACT

A convergent-divergent nozzle for supersonic expansion of turbine motive fluid is presented wherein the major part of contouring of the flow paths between adjacent nozzles is in the direction between top and bottom walls between adjacent nozzle side walls, the contouring being accomplished by contoured top and bottom nozzle walls which are asymmetrically contoured in an axial direction to define a symmetric flow path therebetween.

31 Claims, 10 Drawing Figures

FIG. 1
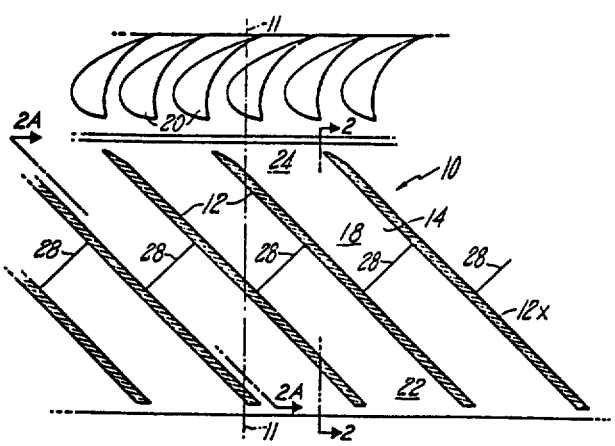
FIG. 3
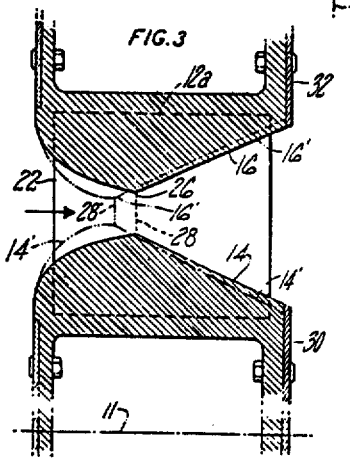
FIG. 2
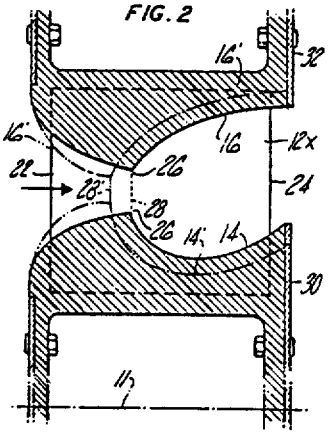
FIG. 2A
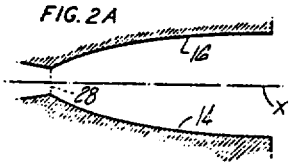
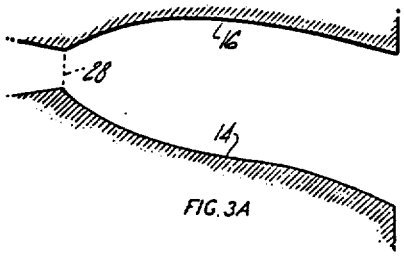
FIG. 3A

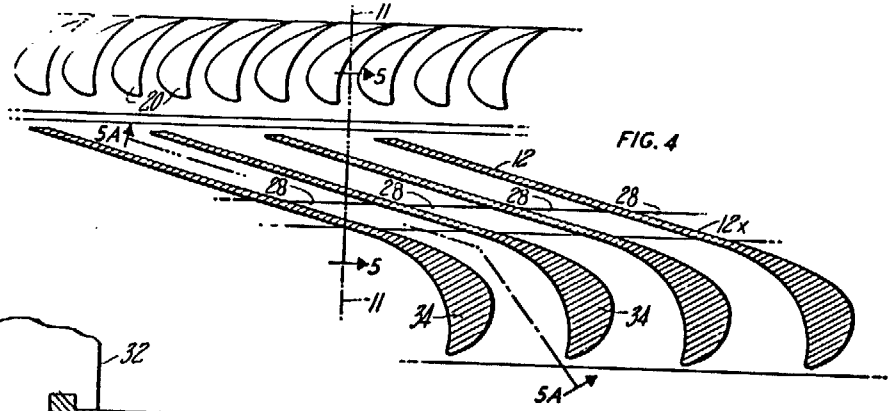
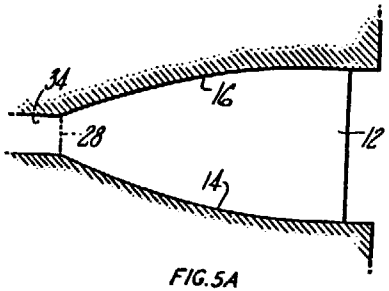
FIG. 5A
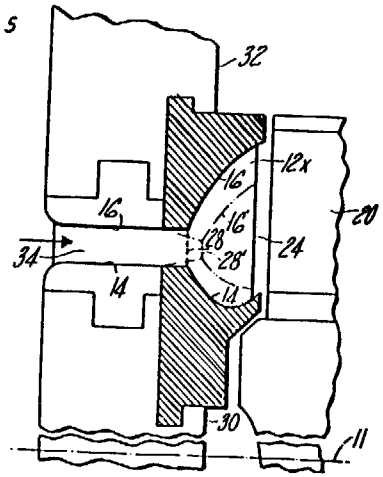
FIG. 5

28
18
42
44
X
X'
t
t'
40
20
14
16
6A

CONTOURED SUPERSONIC NOZZLE

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of application Ser. No. 362,402 filed May 21, 1973, now abandoned.

BACKGROUND OF THE INVENTION

This invention relates to the field of nozzles for turbomachinery. More particularly, this invention relates to the field of convergent-divergent nozzle structure for the creation and expansion of supersonic flow of a compressible fluid for turbine motive fluid.

Converging-diverging nozzles are needed to create and expand a supersonic stream (a pressure ratio exceeding approximately 1.85) to transform a high energy stream into a high velocity jet with good efficiency and minimal shock, flow separation or jet deflection.

Conventional prior art nozzles for convergent-divergent supersonic expansion are of two general types. One type has convergent-divergent profiles machined into opposed side surfaces or side walls of adjacent nozzles so as to define, in one dimension, convergent-divergent passages between these profiled side surfaces. The top and bottom surfaces of such passages are parallel to each other to define a constant height for the convergent-divergent passage, or the height may vary linearly between nozzle inlet and exit. The other type of conventional nozzle is in the form of rounded nozzle passages, as used in drilled and reamed nozzle blocks. The passages machined into these nozzle blocks may be circular in cross-section and thus two-dimensionally convergent-divergent. In any case, the contours of the nozzle passages, including convergence, divergence and throat location, are not defined by the inner and outer circumferential walls of the nozzle passage; rather, they are defined either by the contouring between the side walls in the nozzle or by the uniform annular variations of the drilled and reamed passages.

Both of these prior art nozzle configurations, i.e., those in which the converging, throat and diverging sections, are defined either by spacing between contoured adjacent side walls of nozzle elements or by the circumferential changes in the drilled and reamed passages, are characterized by several problems and disadvantages of long standing in the art. Cost is a particular problem in that precise machining must be employed to achieve the desired side wall contours where the passages are being defined by the contours between adjacent side walls; and, similarly, expensive drilling and reaming is involved for the drilled and reamed devices. In addition, the entire unit can be rendered useless by a mistake in the machining of other forming operations, and tolerances are particularly critical.

Another particular problem is that these prior art devices present distinct limitations in regard to flow capacity. In the round nozzles, for example, increased capacity is achieved by enlarging the contoured circular passages, thus also increasing the overall size of the unit. Assuming that the nozzles are arrayed in a circumferential array for communication with a turbine wheel, an attempt to increase capacity invariably results in enlargement of the overall size of the turbo-machinery beyond merely a diameter change, a result which is often very undesirable or which may result in excessive tip speeds. Similarly, if the nozzle arrays are associated with a radial turbine rather than an axial turbine, the increased size of the nozzle array required for increased flow capacity results in a disproportioning in size between the nozzle unit and the turbine wheel and may lead to inefficient delivery of motive fluid to the turbine wheel.

SUMMARY OF THE INVENTION

For the sake of clarity in discussing the invention herein, it will be understood that the term "nozzle" is a structural and functional element with a flow passage defined by a pair of adjacent side walls and opposed top and bottom walls. Relating that terminology to the prior art, the contouring to accomplish convergence, throat definition and divergence has been accomplished by curved and relatively complex contouring of the adjacent side walls of individual nozzles so that adjacent side walls converge with respect to each other to a point of minimum separation and then diverge with respect to each other, the plane of minimum separation defining the throat. The opposed top and bottom walls are typically parallel to each other.

By way of major distinction, in the primary embodiment of the present invention the adjacent side walls are regular throughout most or all of their length and the definition of the throat in the nozzle as well as the definition of the converging and diverging portions of the nozzle passage are defined primarily by contouring both of the opposed top and bottom walls which may be full or partial rings. The word "regular" as used herein and in the claims means that the side walls are flat surfaced straight or curved elements, as distinguished from contoured walls which serve to vary the flow path therebetween. Stated in another way, adjacent side walls are parallel to each other (including equidistantly spaced curved surfaces) when viewed as a flat developed section of the nozzle ring or when used as a radial section with respect to the turbine axis. The contouring of both of the opposed top and bottom walls may be easily accomplished by simple turning on a lathe or by sheet metal forming, as distinguished from the very complex three dimensional machining of the side walls as has previously been required with the situation wherein nozzle contouring was defined between adjacent side walls. However, the contouring of the opposed top and bottom walls must be such that top and bottom walls present a symmetrical flow passage between the top and bottom walls downstream of the throat in the direction of gas flow. Bearing in mind that the nozzles are in an annular array, compensation must be made for the annular curvature in order to achieve a symmetric flow passage in the direction of gas flow; accordingly, contouring of the top and bottom walls downstream of the throat is nonsymmetrical, the asymmetry being a function of the annular curvature of the nozzle array. This contouring of the top and bottom walls makes it possible to locate or relocate the throat of the nozzle merely by interchanging pieces of metal of different angular or curved shapes and permits an accommodation of wide flow ranges merely by removing the top and bottom surfaces and substituting top and bottom surfaces of different angular or curved shapes. All of this can be accomplished without in any way disturbing the adjacent side walls of the nozzle passages. This invention, most importantly, also makes possible the use of simple sheet metal elements to form the side walls of supersonic nozzle passages, and these sheet metal elements can be standard elements which are easily bent or formed to take on a desired shape; this being in significant contrast to the prior art wherein these adjacent side wall components had to be precisely and intricately machined in three dimensions. Furthermore, as indicated above, wide changes in flow rates, pressure ratios, Mach number and other performancee parameters and characteristics can be accomplished and accommodated merely by substitution of top and bottom wall elements of different angular or curved shapes and sizes.

The asymmetrical contouring of the top and bottom walls of the nozzle downstream of the throat occurs in the axial direction, i.e. in a radial plane which includes the axis of the turbine. This asymmetrical contouring in the axial plane produces a symmetrical flow passage between the top and bottom walls of the nozzle in the direction of gas flow, thus providing for desired shock-wave interaction to produce balanced flow conditions. This asymmetrical contouring of the top and bottom walls downstream of the throat to produce a symmetrical flow passage is a most important feature of the present invention which distinguishes this invention over the patent to Angell U.S. Pat. No. 2,910,005 where it has been suggested to contour just the inner wall of a nozzle passage, thus creating a nonsymmetrical flow passage.

The throat of the nozzle of the present invention, i.e. the plane of smallest cross-sectional area, is determined by the contouring of the top and bottom walls of the nozzle rather than by complex contouring of the side walls. The throat may be perpendicular to the flow passage, or it may be arranged at any desired angle to the flow passage. In addition, if desired, a part of the adjacent nozzle side walls can be curved so as to cooperate with the contouring of the top and bottom walls in defining the location of the throat. However, in such an arrangement the contours of the top and side walls are still the major factor, i.e. contribute greater than 50% in determining the location of the throat and defining the convergent and divergent sections of the nozzle.

A point of major importance to note in connection with the present invention is that since the location of the throat is defined by contouring of the top and bottom walls of the nozzle passage, the location and/or size of the throat and hence the area ratio of the nozzle can be changed at will merely by substitution of a different top and bottom wall element. Thus, it becomes possible to form nozzle arrays having standard and inexpensive sheet metal elements defining adjacent side walls, and these standard nozzle arrays can be adapted for a wide range of requirements by a proper selection of contoured top and bottom wall segments which can also be of sheet metal and which can be made to be easily insertable and removable as units.

Accordingly, one object of the present invention is to provide a novel and improved convergent-divergent supersonic nozzle element.

Another object of the present invention is to provide a novel and improved convergent-divergent supersonic nozzle element wherein the location of the throat is defined by contouring of the top and bottom walls of the nozzle.

Still another object of the present invention is to provide a novel and improved convergent-divergent supersonic nozzle unit wherein adjacent side walls are parallel throughout all or a large part of their length and wherein the nozzle throat is defined by contouring of the top and bottom walls of the nozzle unit.

Still another object of the present invention is to provide a novel and improved convergent-divergent supersonic nozzle unit wherein the divergent section has asymmetrical top and bottom walls in the axial direction to define a symmetrical flow passage therebetween.

Another object of the present invention is to provide a novel and improved supersonic nozzle unit wherein standard nozzle side wall elements can be employed and wherein the unit is adaptable for a wide range of requirements by use of differently contoured top and bottom wall elements.

Other objects and advantages of the present invention will be apparent to and understood by those skilled in the art from the following detailed drawings and description.

BRIEF DESCRIPTION OF THE DRAWINGS

Referring now to the drawings, wherein like elements are numbered alike in the several figures:

FIG. 1 is a generalized partial schematic showing of a turbine nozzle unit of the present invention shown in a horizontal development with the top walls of the nozzle elements removed;

FIG. 2 is a view along line 2—2 of FIG. 1, with the other walls 12 removed to permit an unobstructed view of wall 12x, showing the nozzle top and bottom walls contoured asymmetrically;

FIG. 2A is a view along line 2A—2A of FIG. 1 showing a symmetrical flow path defined by top and bottom walls contoured asymmetrically as in FIG. 3;

FIG. 3 is a view like FIG. 2 taken along line 2—2 of FIG. 1 showing the nozzle top and bottom contoured walls without the important feature of axial asymmetrical contouring;

FIG. 3A is a view along line 2A—2A of FIG. 1 showing a nonsymmetrical flow path defined by top and bottom walls contoured as in FIG. 2;

FIG. 4 is a modified version similar to FIG. 1 showing partial curved and profiled sections of the nozzle side walls. The side wall profiling affecting only the subsonic portion of the nozzle;

FIG. 5 is a view of wall 12x along line 5—5 of FIG. 4 with the other walls removed to permit an unobstructed view of wall 12x;

FIG. 5A is a view along line 5A—5A of FIG. 4;

DESCRIPTION OF THE PREFERRED EMBODIMENTS

Figures 6, 6A:
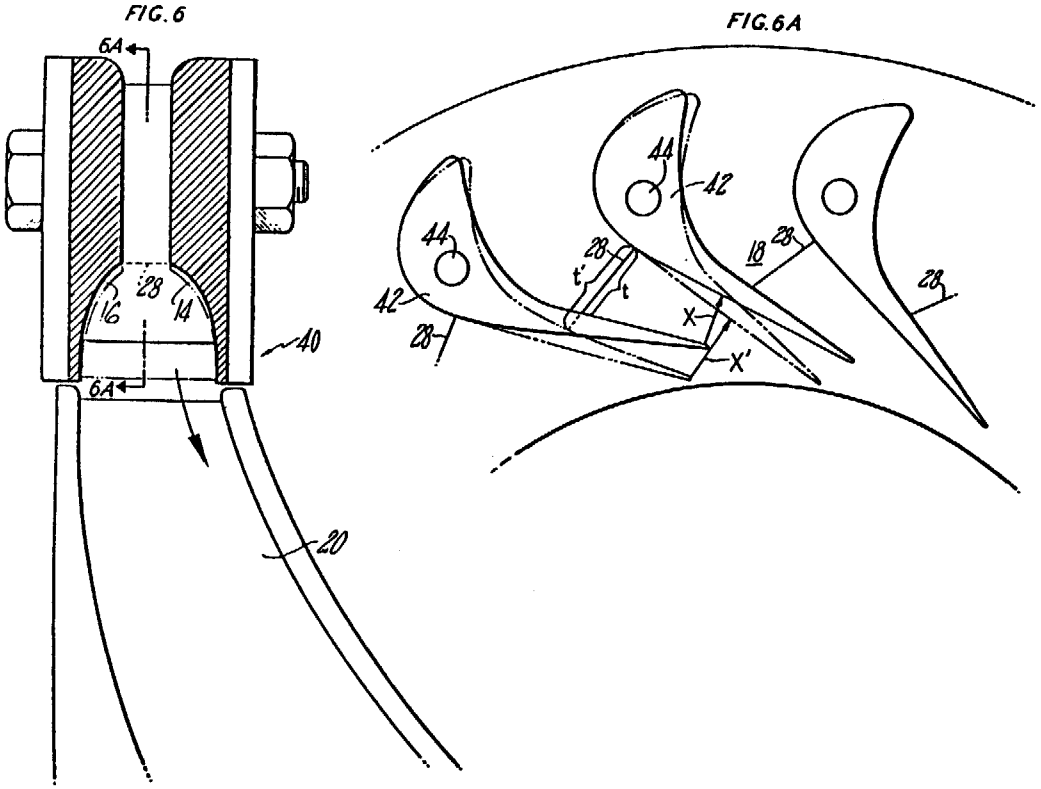
FIG. 6 is a partial side elevation view of a radial turbine according to the present invention.
FIG. 6A is a view along line 6A—6A of FIG. 5.

Referring now to a combined consideration of FIGS. 1 and 2, each nozzle 10 of the present invention is made up of a pair of adjacent side wall 12, a bottom wall 14, and a top wall 16, the walls combining to define a flow passage 18 for the delivery of motive fluid to the buckets 20 of a turbine wheel. The nozzles 10 are arranged in an annular array about the axis 11 of the turbine wheel. The turbine wheel forms no further part of this invention, and no further description is made of it herein. It will, however, be noted that the same principle of top and bottom wall contouring to be described herein may also be applied to the rotating blading of reaction turbines, to provide a supersonic expansion across the rotating blades.

The side walls 12 may be made of any desirable and even simple material such as sheet metal, and the discharge ends adjacent the turbine buckets are slightly angled or contoured to form pointed or rounded ends of somewhat airfoil shape to minimize flow separation or shock. The important point to note is that along the major length of the side walls 12 from the plane of flow inlet 22 to the plane of discharge 24 the side walls are regular (or parallel in projection or radial section). Thus, all of the previous exotic contouring common in the prior art to determine convergent, divergent and throat sections of individual supersonic nozzles is not present in these side walls.

Referring now to FIG. 2, it can be seen that starting at inlet 22 top wall 16 and bottom wall 14 converge inwardly toward each other to points or locations 26 to form a converging section of the nozzle passage; and the top and bottom walls then diverge away from each other to the outlet 24 to form a diverging section of the nozzle passage. It is of particular importance to note that the invention contemplates the side walls 12 may be of uniform, essentially rectangular shape with the top surface 12a as indicated in FIG. 2, rather than being specifically contoured to conform to the shape of top and bottom walls 14 and 16. Walls 12 in height dimensions may also be of varying height to conform to the changing height between bottom wall 14 and top wall 16. Top and bottom walls 16 and 14 may each be circular rings (preferably machined to provide the desired contouring) with slots to receive side walls 12; or the top and bottom walls may be a plurality of individual segments (which may be contoured sheet metal elements) between each adjacent pair of side walls. Bearing in mind that adjacent walls 12 are regular with no special contouring therebetween, it will be immediately seen that the plane defined between top and bottom walls 16 and 14 at points 26 defines the narrowest cross-section of the passage of flow passage 18, i.e. defines the throat 28. Throat 28 is, of course, only conceptual in that it is the location of the narrowest cross-section of the passageway, and thus it is indicated in phantom in FIG. 2. Expansion downstream of the throat occurs primarily in the direction between the top and bottom walls 16 and 14 rather than between adjacent side walls 12.

Turning now to a combined consideration of FIGS. 2 and 3, FIG. 3 shows a passage contour which is symmetric in an axial plane (i.e. a plane which includes the turbine axis and extends radially through the nozzle annulus) generating a cylindrical vortex. The configuration shown in FIG. 3 generates a gas flow passage or gas path as indicated by the solid lines in FIG. 3A, this gas flow path being a tangentially curved path in order to conform to the curvature of the nozzle annulus. The desired contour is a symmetrical flow or gas path downstream of the throat 28. The curved and nonsymmetrical path of FIG. 3A resulting from the axially symmetric configuration of FIG. 3, although being a possible configuration for the present invention, is not the preferred configuration because it results in considerable thermodynamic disadvantages because the supersonic gas flowing in the nozzle is forced into a tangentially curved path. The resulting shockwaves and expansion waves and secondary flow patterns resulting from the curvature are known to cause serious efficiency losses and possibly choking of the flow passages because exit velocity, pressure and temperature are very different from the desired values.

The configuration of FIG. 2 and the resulting gas flow passage of FIG. 2A eliminate the problems associated with the FIGS. 3 and 3A configuration. The contours of top and bottom walls 16 and 14 downstream of the throat in the FIG. 2 configuration are asymmetrical in the axial plane, the asymmetry being in an amount sufficient to compensate for the effect of the annular curvature of the nozzle annulus so that the symmetrical flow path of FIG. 2A is generated between the top and bottom walls 16 and 14. In other words, the gas flow passage, or the flow path seen by the supersonic gas, downstream of the throat 28 is symmetrical between walls 14 and 16 about line X, line X also representing the direction of flow and coinciding with line 2A—2A of FIG. 1. In this manner the supersonic gas flow is directed through the nozzle and into the rotor blading in a path which is perfectly symmetrical between the top and bottom walls, and supersonic expansion occurs between the top and bottom walls 16 and 14. Efficient supersonic expansion of the gas depends upon the symmetry configuration achieved in the gas path of FIG. 2A so that the top and bottom walls reflect the shockwaves in a proper manner to meet and interact at the flow passage center line X. Conventional prior art designs which depend on the contouring of the side walls for nozzle profiling can not avoid the effects of annular curvature of the nozzle annulus and thus can not achieve the symmetry realized by the present invention.

If for any design consideration whatsoever it becomes desirable or necessary to change the dimension or location of the throat, walls 14 and 16 can be replaced. For example, referring both to FIGS. 2 and 3, walls 14 and 16 are shown as being detachably connected to inner and outer shrouds 30 and 32. Walls 14 and 16 could be replaced merely by detaching them from the shrouds and replacing them with walls having contours indicated at 14' and 16', in which event the intersection points 26' would locate throat 28' at a different position in the throat channel and with a significantly different size. Since side walls 12 may be of uniform shape and size, and since the top and bottom walls 16 and 14 may be individual segments located and housed between adjacent side walls or rings with grooves to receive the side walls, the location and shape of the top and bottom walls, and thus the location and size of the nozzle throat, can be changed without any modification or change whatsoever in the side walls. This means that the side walls can be of simple material such as sheet material airfoil shapes and can be permanently installed in the nozzle wheel, thus creating a nozzle wheel which can be varied for a wide range of applications merely by changing top and bottom walls which define the nozzle passages.

Referring now to FIGS. 4, 5 and 5A, views similar to FIGS. 1, 2 and 2A are shown with one modification. That one modification is that the upstream bends of the adjacent nozzle walls 12 have curved and/or profiled sections 34 upstream of the throat plane 28. The side wall segments 12 may still be formed of simple sheet metal elements with these curved or profiled upstream end portions 34 being either integral with walls 12 or separate attached pieces. However, by incorporation of these curved or profiled upstream end portions the height between lower and upper walls 14 and 16 may remain constant, i.e., as shown in FIG. 5 walls 14 and 16 may be parallel where they are coextensive with the curved or profiled end sections 34, and the flow passages will still be converging between end sections 34 because of the shape between adjacent end sections. The side walls in this configuration are regular downstream of the throat 28 and divergence is accomplished as in FIG. 2 and FIG. 3 by divergence of the bottom and top walls 14 and 16 away from each other. The divergence of the walls 14 and 16 is preferably asymmetrical in the axial plane shown in FIG. 5 to produce the symmetrical flow path downstream of the throat as shown in FIG. 5A. Of course, in the configuration of FIGS. 4 and 5 the top and bottom walls 16 and 14 upstream of the throat can also be inclined toward each other (as shown in dotted lines in FIG. 5) so that the relative inclination of these walls would also contribute to the definition of the converging portion of the flow passages. Thus, by providing the curved upstream end portions 34 of the adjacent side walls the convergent part of the nozzle passage can be defined either by the relationship between the side walls, or by a combination of the relationship between the side walls and the relationship between the top and bottom walls. The dotted line configuration of FIG. 5 also shows variation in location and size of the throat 28' by substitution of top and bottom walls 16' and 14'.

It is to be noted that by selection or adjustment of the geometry of walls 16 and 14 the gas flow discharging from the nozzles can be in the form of a circular cylinder or a converging or diverging cylinder. Thus, the contour and direction of the gas path can be selected and developed such as is shown in FIGS. 1, 2 and 2A so as to make the axial component of the gas enter the rotor blading in a direction parallel to the rotor axis. Similarly, by selecting and developing the direction and shape of the gas path as shown in FIGS. 4, 5 and 5A, the gas can be made to exit the nozzle annulus and enter the blading in a conical pattern which converges toward or diverges away from the rotor axis. It is important to note that such changes in flow pattern can be obtained by simply changing the top and bottom walls to appropriate shapes for the desired end result, but without changing or affecting the side walls 12. Especially when considered in conjunction with the variability of throat area and area ratio which can be accomplished with the present invention, this means that such changes and adjustments can be made to existing equipment and that the resulting flexibility of design achieved by the present invention can be used for purposes of cost reduction and standardization of equipment which must presently be custom engineered and individually manufactured.

It is also to be noted that by appropriate configuration of the top and bottom walls in conjunction with the selection of the flow path the location of the throat 28 in each nozzle may be staggered from nozzle to nozzle (as shown in FIG. 1), or the location of throat may be in a common plane in each nozzle (as shown in FIG. 4) whereby what may be termed a throat line is generated which is circumferential and tangential with respect to the nozzle annulus. No such circumferential and tangential throat line is now known in the prior art.

An important point to note is that the ability of the present invention to define the converging and diverging portions of the nozzle passages in the height of the passages rather than in the width of the passages between the side walls as in prior art, makes it possible to design symmetrical flow passages of extremely high volume capacity but of short length from inlet to outlet. This factor is of extreme important in installations where very high flow volumes are needed but where space requirements would otherwise limit the size of the machinery and thus prevent realization of the desired flow capacity. For example the gas path of FIG. 5A which results from the contours shown in FIG. 5, is known as a "sharp-edged supersonic nozzle of minimum length", and it depends for efficient operation on the symmetry of the gas path resulting from the contours of FIG. 5 which are a function of and compensate for the curvature of the annular nozzle ring.

The principles of the present invention, particularly the contouring of the inner and outer walls, can be applied to any apparatus where a supersonic gas stream is desired. FIGS. 6 and 6A shows these principles applied to a radial turbine 40. Radial turbine 40 has an array of contoured vane elements 42 which are pivotally mounted on posts 44 to provide an adjustable vane configuration. The vanes constitute the side walls of the nozzles in the context of the terminology of the present invention. The nozzle passages 18 are defined by adjacent vanes 42 and by opposed top and bottom or outer and inner walls 16 and 14 which are contoured as desired to define the nozzle throat 28 and the divergent flow passage downstream of the throat from which the supersonic flow is delivered to the buckets 20.

The ability to incorporate an adjustable vane arrangement in a supersonic machine is a significant improvement over conventional designs. Adjustable stator blades are common for subsonic apparatus, but prior art technology using contoured nozzle side wall profiles to define a throat and divergent passage does not accommodate adjustment by vane rotation in supersonic apparatus since the rotation would disturb the passage symmetry which is essential for efficient supersonic expansion. In the present invention distortion of passage symmetry is avoided because the supersonic expansion occurs in a direction perpendicular to the plane of movement of the side wall vanes.

Adjustment of the vanes may be by manual setting or may be continuously variable by controls in conventional manners. A first setting of the vanes is shown in the solid lines in FIG. 6A, and a second setting is depicted by the dashed line configuration with prime superscripts indicating dimensions in the second configuration. The adjustability feature not only allows variation of throat width (defined as t and t') and exit width (defined as X and X') but it also permits variation of the area ratio $A^*/A$ (where $A^*$ equals throat area and A equals exit area) and hence pressure ratio. This is so because the vane geometry and point of rotation can be selected so as to complement the geometry of the profiled walls 14 and 16 in such a manner as to vary the width of the original throat 28 as a fixed or variable relationship of exit width X, both being a function of angular nozzle position. In the position shown in the dashed lines in FIG. 6A, the area ratio would be a maximum, being dominated by the contours of walls 16 and 14. Changing the vanes into the position shown in the solid lines, throat area would be only slightly reduced while exit area would be reduced by about 25%. Hence, the area ratio would be reduced by approximately 25%. It is important to note that the capability of incorporating adjustable vanes in a supersonic configuration produces the capability of varying area ratio, and not just exit area; conventional subsonic designs vary only exit area since they incorporate no throat.

While a preferred embodiment has been shown and described, various modifications and substitutions can be made thereto without departing from the spirit and scope of the invention. Accordingly, this invention has been described by way of illustration and not limitation.

What is claimed is:

1. A convergent-divergent nozzle including:
a pair of opposed spaced apart side walls;
a top wall extending between said side walls; and
a bottom wall spaced from said top wall and extending between said side walls;
said top and bottom walls and said side walls cooperating to define a flow passageway; and
said top and bottom walls being contoured to cooperate with each other to define at least the throat of the nozzle and a divergent section downstream of the throat, said contouring of said top and bottom walls defining a symmetric flow passage therebetween in the direction of flow downstream of said throat.

2. A convergent-divergent nozzle as in claim 1 wherein:
said contouring of said top and bottom walls is the major factor in defining said throat.

3. A convergent-divergent nozzle as in claim 1 wherein:
said opposed side walls are regular throughout the major part of their length.

4. A convergent-divergent nozzle as in claim 1 wherein:
the angle of said throat with respect to the direction of flow in the nozzle downstream of the throat is a function of the contouring of said top and bottom walls.

5. A convergent-divergent nozzle as in claim 1 wherein:
said side walls are of uniform size and shape.

6. A convergent-divergent nozzle as in claim 1 wherein:
said contoured wall is detachably connected to support means whereby said contoured walls are replaceable with walls of different contour to change the definition of the throat of the nozzle and the divergent section of the nozzle.

7. A convergent-divergent nozzle as in claim 1 wherein:
said top and bottom walls are contoured to also define the convergent section of the nozzle.

8. An array of convergent-divergent nozzles about an axis for delivery of motive fluid to a turbine, each of said nozzles including:
a pair of opposed spaced apart side walls;
a top wall extending between said side walls; and
a bottom wall spaced from said top wall and extending between said side walls;
said top and bottom walls and said side walls cooperating to define a flow passageway; and
said top and bottom walls being contoured to define at least the throat of the nozzle and the divergent section of the nozzle, said contouring of said top and bottom walls of each nozzle being asymmetric with respect to said axis and defining a symmetric flow passage between said top and bottom walls in the direction of flow downstream of said throat.

9. An array of convergent-divergent nozzle as in claim 8 wherein:
said contouring of said top and bottom walls in each nozzle is the major factor in defining said throat.

10. An array of convergent-divergent nozzles as in claim 8 wherein:
said opposed side walls of each nozzle are regular throughout the major part of their length.

11. An array of convergent-divergent nozzles as in claim 8 wherein:
the angle of said throat with respect to the direction of flow in the nozzle downstream of the throat is a function of the contouring of said top and bottom walls.

12. An array of convergent-divergent nozzles as in claim 8 wherein:
said side walls of each nozzle are of uniform size and shape.

13. An array of convergent-divergent nozzles as in claim 8 wherein:
said contoured walls of each nozzle are detachably connected to support means whereby said contoured walls are replaceable with walls of different contour to change the definition of the throat of the nozzle and the divergent section of the nozzle.

14. An array of convergent-divergent nozzles as in claim 8 wherein:
both said top and bottom walls of each nozzle are contoured to also define the convergent section of the nozzle.

15. An array of convergent-divergent nozzles as in claim 8 wherein:
the array of nozzle forms the input to an axial turbine rotating about said axis.

16. An array of convergent-divergent nozzles as in claim 15 wherein:
the array of nozzles form the input to a radial turbine.

17. An array of convergent-divergnt nozzles as in claim 16 wherein:
said side walls are adjustable.

18. An array of convergent-divergent nozzles about an axis of a turbine for passage of motive fluid at supersonic speed, each of said nozzles including:
a pair of opposed spaced apart side walls;
a top wall extending between said side walls; and
a bottom wall spaced from said top wall and extending between said side walls;
said top and bottom walls and said said walls cooperating to define a flow passageway; and
said top and bottom walls being contoured to define at least the throat of the nozzle and the divergent section of the nozzle, said contouring of said top and bottom walls of each nozzle being asymmetric with respect to said axis and defining a symmetric flow passage between said top and bottom walls in the direction of flow downstream of said throat.

19. A convergent-divergent nozzle as in claim 18 wherein:
said contouring of said top and bottom walls is the major factor in defining said throat.

20. A convergent-divergent nozzle as in claim 18 wherein:
said opposed side walls are regular throughout the major part of their length.

21. A convergent-divergent nozzle as in claim 18 wherein:
the angle of said throat with respect to the direction of flow in the nozzle downstream of the throat is a function of the contouring of said top and bottom walls.

22. A convergent-divergent nozzle as in claim 18 wherein:

said side walls are of uniform size and shape.

23. A convergent-divergent nozzle as in claim 18 wherein:

said top and bottom walls are contoured to also define the convergent section of the nozzle.

*24. An array of convergent-divergent nozzles about an axis of a turbine for passage of motive fluid at supersonic speed, each of said nozzles including:*

*a pair of opposed spaced apart side walls;*

*a top wall extending between said side walls; and*

*a bottom wall spaced from said top wall and extending between said side walls;*

*said top and bottom walls and said side walls cooperating to define a flow passageway; and*

*said top and bottom walls being contoured to define at least the throat of the nozzle and the divergent section of the nozzle, said contouring of said top and bottom walls of each nozzle defining a symmetric flow passage between said top and bottom walls in the direction of flow downstream of said throat.*

*25. A convergent-divergent nozzle as in claim 24 wherein:*

*said contouring of said top and bottom walls is the major factor in defining said throat.*

*26. A convergent-divergent nozzle as in claim 24 wherein:*

*said side walls are of uniform size and shape.*

*27. A convergent-divergent nozzle as in claim 24 wherein:*

*said top and bottom walls are contoured to also define the convergent section of the nozzle.*

*28. An array of convergent-divergent nozzles about an axis of a turbine for passage of motive fluid at supersonic speed, each of said nozzles including:*

*a pair of opposed spaced apart side walls;*

*an outer wall extending between said side walls; and*

*an inner wall spaced from said top wall and extending between said side walls;*

*said outer and inner walls and said side walls cooperating to define a flow passageway; and*

*said outer and inner walls being contoured to define at least the throat of the nozzle and the divergent section of the nozzle, said contouring of said outer and inner walls of each nozzle defining a symmetric flow passage between said top and bottom walls in the direction of flow downstream of said throat.*

*29. A convergent-divergent nozzle as in claim 28 wherein:*

*said contouring of said outer and inner walls is the major factor in defining said throat.*

*30. A convergent-divergent nozzle as in claim 28 wherein:*

*said side walls are of uniform size and shape.*

*31. A convergent-divergent nozzle as in claim 28 wherein:*

*said top and bottom walls are contoured to also define the convergent section of the nozzle.*

* * * * *